US010561917B1

(12) United States Patent
Naro et al.

(10) Patent No.: US 10,561,917 B1
(45) Date of Patent: Feb. 18, 2020

(54) BASKETBALL TRAINING APPARATUS WITH REAL-TIME USER FEEDBACK ON SHOOTING FORM

(71) Applicants: John Nicholas Naro, Portland, OR (US); Samuel Hunter, Boulder, CO (US); Robert Wild, Portland, OR (US)

(72) Inventors: John Nicholas Naro, Portland, OR (US); Samuel Hunter, Boulder, CO (US); Robert Wild, Portland, OR (US)

( * ) Notice: Subject to any disclaimer, the term of this patent is extended or adjusted under 35 U.S.C. 154(b) by 0 days.

(21) Appl. No.: 16/567,120

(22) Filed: Sep. 11, 2019

Related U.S. Application Data

(63) Continuation-in-part of application No. 16/230,087, filed on Dec. 21, 2018, now abandoned, which is a continuation-in-part of application No. 15/985,971, filed on May 22, 2018, now Pat. No. 10,195,509.

(60) Provisional application No. 62/509,554, filed on May 22, 2017.

(51) Int. Cl.
| | |
|---|---|
| *A63B 69/00* | (2006.01) |
| *A63B 24/00* | (2006.01) |
| *A63B 23/12* | (2006.01) |
| *A63B 21/00* | (2006.01) |
| *G06K 9/00* | (2006.01) |

(52) U.S. Cl.
CPC ...... *A63B 69/0071* (2013.01); *A63B 21/4017* (2015.10); *A63B 23/1281* (2013.01); *A63B 24/0003* (2013.01); *G06K 9/00342* (2013.01); *A63B 69/0059* (2013.01)

(58) Field of Classification Search
CPC ........... A63B 69/0071; A63B 69/0059; A63B 2220/836; A63B 69/3608; A63B 2220/16

USPC ................. 473/447, 450, 422; 602/16, 20
See application file for complete search history.

(56) References Cited

U.S. PATENT DOCUMENTS

| | | |
|---|---|---|
| 3,698,389 A | 10/1972 | Guedel |
| 5,149,085 A | 9/1992 | Sanchez |
| 5,544,877 A | 8/1996 | Brownell |
| 5,816,952 A | 10/1998 | Blevins |
| 5,865,695 A | 2/1999 | Mahala |
| 6,478,758 B1 | 11/2002 | Hassler |
| 7,367,958 B2 | 5/2008 | McBean |
| 7,410,471 B1 | 8/2008 | Campbell |
| 7,442,133 B2 | 10/2008 | Wolf |
| 7,658,681 B1 | 2/2010 | Malecha |
| 7,771,293 B1 | 8/2010 | Vann |
| 7,775,898 B1 | 8/2010 | Allen |
| 8,038,549 B2 | 10/2011 | Vann |
| 8,152,660 B1 | 4/2012 | Jimenez, Jr. |
| 8,926,455 B2 | 1/2015 | Drozjock |

(Continued)

*Primary Examiner* — Mark S Graham
(74) *Attorney, Agent, or Firm* — Plager Schack LLP; Mark H. Plager; Eric Liou

(57) ABSTRACT

A basketball training apparatus to provide user feedback on shooting form is provided. The basketball training apparatus includes a sleeve disposed around the user's upper arm and forearm, a strut assembly coupled to the sleeve and having an upper strut pivotably mounted to a lower strut, a Hall Effect sensor disposed within the junction of the upper and lower struts, a pair of magnets coupled to the strut assembly's junction, a controller disposed within the strut assembly and electrically coupled to the Hall Effect sensor, and an alert mechanism disposed within the strut assembly and electrically coupled to the controller. Pivotable movement of the upper strut relative to the lower strut to either a first optimal angle or second optimal angle enables the alert mechanism to generate a notification.

14 Claims, 6 Drawing Sheets

(56) References Cited

U.S. PATENT DOCUMENTS

| | | |
|---|---|---|
| 8,939,853 B1 | 1/2015 | Karn |
| 10,195,509 B1 | 2/2019 | Naro |
| 2002/0183673 A1 | 12/2002 | Naft |
| 2007/0219025 A1 | 9/2007 | Aberton |
| 2011/0045925 A1 | 2/2011 | Moye |
| 2012/0100939 A1 | 4/2012 | Townsend |
| 2012/0190483 A1 | 7/2012 | Grover |
| 2016/0089573 A1 | 3/2016 | House |
| 2016/0338644 A1 | 11/2016 | Connor |
| 2017/0189756 A1 | 7/2017 | Brothers |

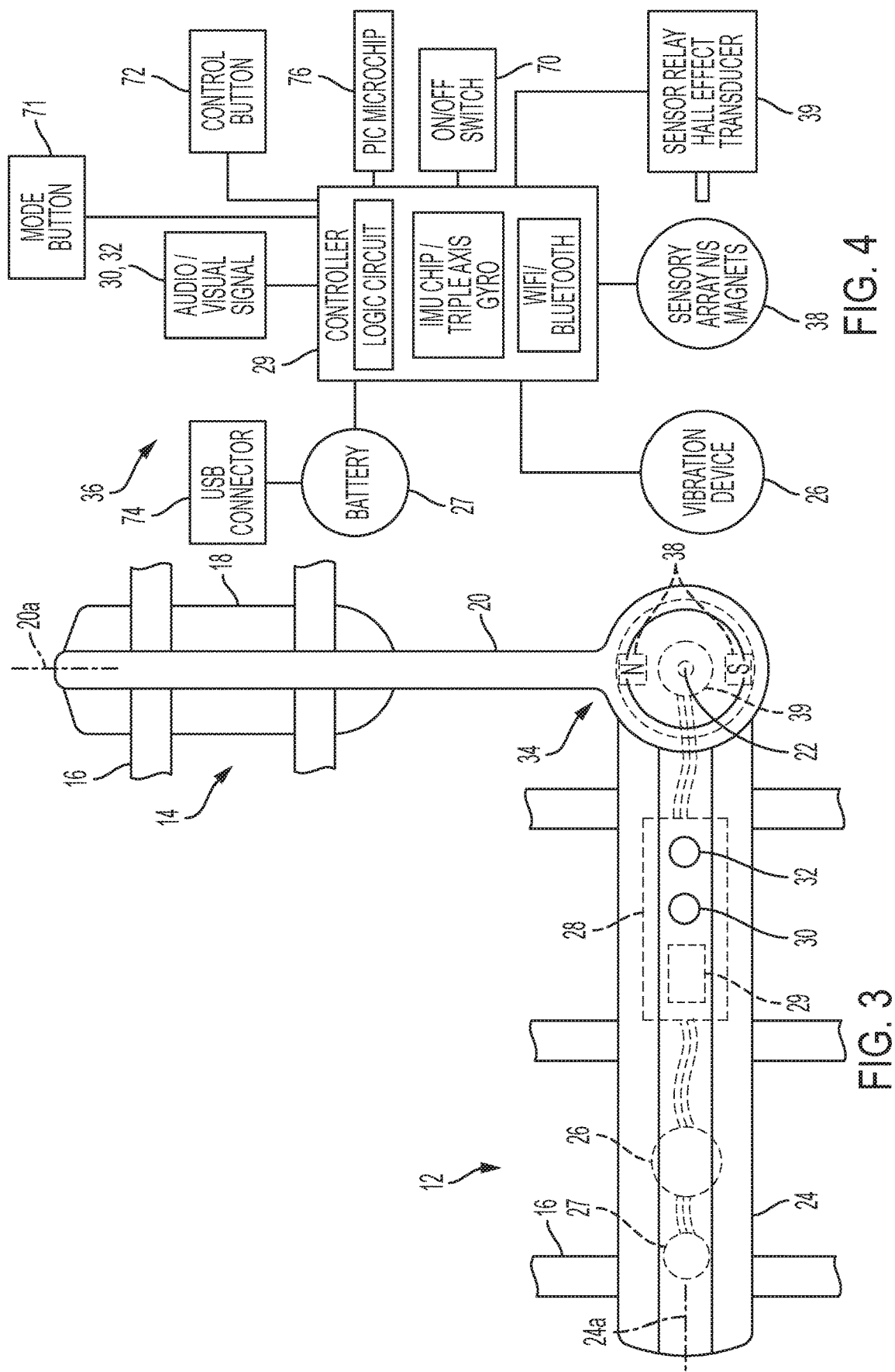

US 10,561,917 B1

BASKETBALL TRAINING APPARATUS WITH REAL-TIME USER FEEDBACK ON SHOOTING FORM

RELATED APPLICATION

The application claims priority to non-provisional patent application U.S. Ser. No. 16/230,087 filed on Dec. 21, 2018. Non-provisional patent application U.S. Ser. No. 16/230,087 claims priority to non-provisional patent application U.S. Ser. No. 15/985,971 filed on May 22, 2018, which claims priority to provisional patent application U.S. Ser. No. 62/509,554 filed on May 22, 2017, the entire contents of which is herein incorporated by reference.

BACKGROUND

The embodiments herein relate generally to basketball training aids. More specifically, embodiments of the invention are related to a basketball training apparatus that provides feedback to a user pertaining to his/her shooting form.

Basketball players continually work on improving their shooting form to improve the accuracy and consistency of shots. Proper shooting mechanics require the player to keep the shooting elbow in and maneuver the shooting arm from a 90 degree angle to a 180 degree angle during the follow through while breaking the wrist and fingertips on the finish. Players practice their shooting form on drills. Although coaches may provide feedback to a player during a practice shot, it is difficult for a coach to provide instantaneous feedback to the player during the course of a shot.

Several basketball shooting tools exist as disclosed in U.S. Patent Application Publication 2012/0190483, and U.S. Pat. Nos. 8,038,549 and 5,865,695. These devices attach to a portion of the user's arm and help the user to achieve proper shooting form through the use of mechanical resistance, visual indicia or other alerts in the form of an illuminating light or sound. However, these devices are limited because: 1) the tools lack real-time feedback throughout the entire basketball shot from the beginning to the follow-through; and/or 2) the tools do not account for the undesirable "flying elbow" when generating feedback on the user's shooting form.

As such, there is a need in the industry for a basketball training apparatus with enhanced durability that addresses the limitations of the prior art, which provides real-time feedback to the user on his/her shooting form and mechanics during the course of a shot from the beginning to the follow-through.

SUMMARY

In certain embodiments, a basketball training apparatus for use to provide a user real-time feedback on shooting form is provided. The basketball training apparatus is configured to secure to an upper arm and a forearm of the user.

In certain embodiments, the basketball training apparatus comprises a sleeve configured to dispose around the upper arm and forearm of the user, a pair of loops coupled to the sleeve, a strut assembly coupled to the sleeve and comprising an upper strut pivotably mounted to a lower strut, the upper strut extending through a first loop in the pair of loops and configured to couple to the upper arm of the user, the lower strut extending through a second loop in the pair of loops and configured to couple to the forearm of the user, the strut assembly comprising a pivot housing at a junction of the upper and lower struts, a Hall Effect sensor disposed within the junction of the strut assembly, a pair of magnets coupled to an interior of the pivot housing of the strut assembly, a controller disposed within the upper strut of the strut assembly and electrically coupled to the Hall Effect sensor, and an alert mechanism disposed within the upper strut of the strut assembly and electrically coupled to the controller, wherein pivotal movement of the upper strut relative to the lower strut to a first optimal angle defined by a first longitudinal axis of the upper strut and a second longitudinal axis of the lower strut positions the pair of magnets in a first operational position relative to the Hall Effect sensor to enable the alert mechanism to generate a first notification, wherein pivotal movement of the upper strut relative to the lower strut to a second optimal angle formed by the first longitudinal axis of the upper strut and the second longitudinal axis of the lower strut positions the pair of magnets in a second operational position relative to the Hall Effect sensor to enable the alert mechanism to generate a second notification.

BRIEF DESCRIPTION OF THE FIGURES

The detailed description of some embodiments of the invention will be made below with reference to the accompanying figures, wherein the figures disclose one or more embodiments of the present invention.

FIG. 3 depicts a side elevation view of certain embodiments of the basketball training apparatus;

FIG. 4 depicts a schematic view of certain embodiments of the basketball training apparatus;

DETAILED DESCRIPTION OF CERTAIN EMBODIMENTS

Figure 1:
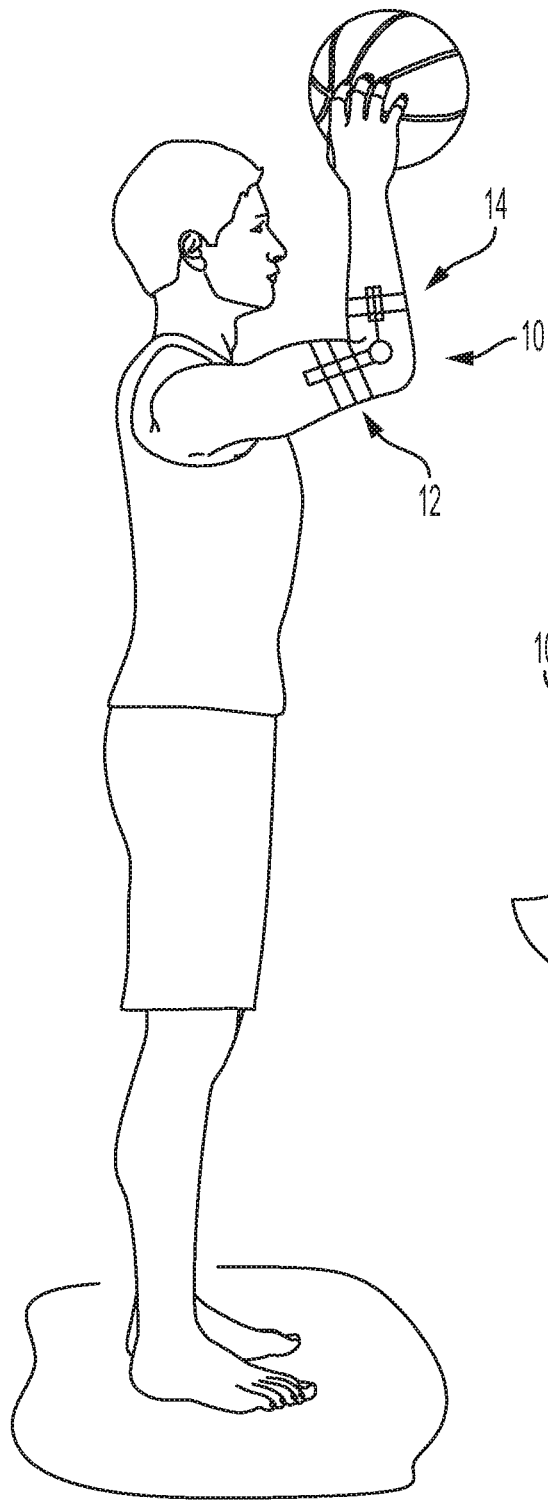
FIG. 1 depicts a side perspective view of certain embodiments of the basketball training apparatus shown in use.
Figure 2:
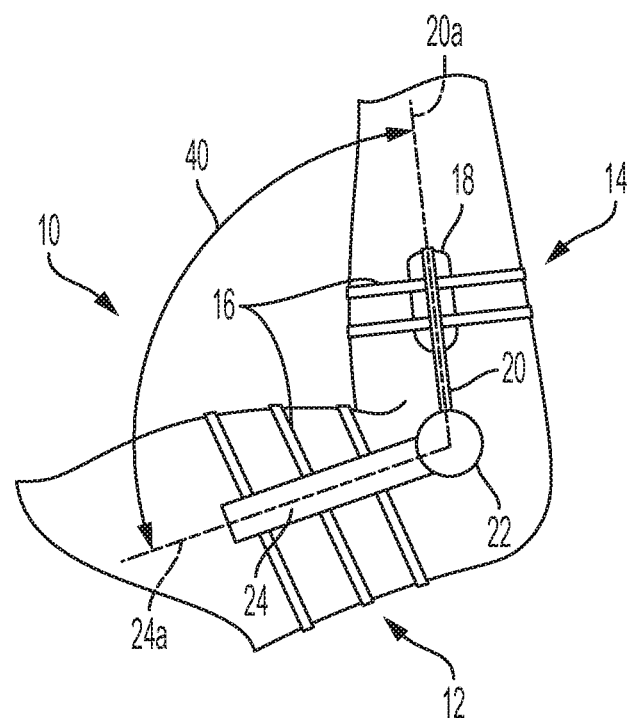
FIG. 2 depicts a side elevation view of certain embodiments of the basketball training apparatus shown in use.

As depicted in FIGS. 1-3, basketball training apparatus 10 is configured to be secured to upper arm 12 and forearm 14 of a user. During use, basketball training apparatus 10 is configured to provide real-time notifications to the user during the course of the basketball shot from the beginning to the follow-through. Basketball training apparatus 10 generally comprises a strut assembly comprising upper strut 24, lower strut 20, strap 16 and mounting pad 18.

Upper and lower struts 24, 20 are pivotably mounted together at pivot 22 and are preferably made from plastic, rubber or other material known in the field. Upper strut 24 is configured to pivotably adjust relative to lower strut 20, which adjusts angle 40. Angle 40 is formed by first longitudinal axis 24a of upper strut 24 and second longitudinal axis 20a of lower strut 20.

In one embodiment, mounting pad 18 is coupled to lower strut 20 and is configured to contact forearm 14 of the user. Mounting pad 18 may be made from any type of resilient and deformable material such as foam, rubber, or other material in the field. In one embodiment, lower strut 20 comprises a pair of telescoping struts that can slidably adjust relative to each other to one of a plurality of locking positions. This permits lower strut 20 to extend or retract to a desired length as needed to accommodate forearm 14, regardless of the user's size and age. In one embodiment, the telescoping struts of lower strut 20 are locked in the desired position using a pin-type member that engages with one of a plurality of openings disposed throughout a strut in the pair of telescoping struts.

In one embodiment, one or more pads (not shown) are coupled to each strut in upper and lower struts 24, 20. Each pad is configured to contact upper arm 12 or forearm 14 to enhance user comfort when basketball training apparatus 10 is used. The one or more pads are made from any resilient and deformable material such as foam, rubber, and the like. Each pad is coupled to upper strut 24 or lower strut 20 by an adhesive or other fastening component known in the field.

A first set of straps 16 is coupled to upper strut 24 and is configured to be disposed around upper arm 12 of the user. Similarly, a second set of straps 16 is coupled to lower strut 20 and is configured to be disposed around forearm 14 of the user. It shall be appreciated that the first and second sets of straps 16 may comprise any number of straps coupled to the strut assembly.

In one embodiment, each strap 16 is a rubberized band that can be wrapped around upper arm 12 or forearm 14, and secured to itself in one of a plurality of locking positions. This allows each strap 16 to conform to the respective arm portion of the user. In one embodiment, each strap 16 is secured in place to the desired locking position by a pin that engages with one of a plurality of openings disposed throughout the strap. It shall be appreciated that straps 16 may comprise alternative fastening mechanisms in alternative embodiments. In one embodiment, alternative fasteners such as hook and loop fasteners, snap components, and the like, may be used to secure straps 16 in place around upper arm 12 or forearm 14.

In one embodiment, at least one loop member is coupled to the side of each strut in upper and lower struts 24, 20. A single strap 16 is coupled to each loop member in a preferred embodiment. The loop member comprises a central opening configured to permit strap 16 to extend therethrough. In one embodiment, strap 16 is configured to wrap around upper arm 12 or forearm 14, through the central opening of the loop member and onto itself by engaging hook and loop fasteners present on strap 16. Although any number of loop members and straps may be used, a single pair of loop member and strap 16 is coupled to each strut 24, 20 in one embodiment.

In an alternative embodiment, each loop member is configured to detachably couple to different locations on upper and lower struts 24, 20. In an alternative embodiment, each loop member is adjustably mounted or slidably mounted to upper or lower struts 24, 20. In these embodiments, the ability to adjust the loop members and corresponding attached straps 16 to different locations on upper and lower struts 24, 20 permits the user to easily secure straps 16 of basketball training apparatus 10 to either the left or right arm of the user.

As depicted in FIGS. 3-4, basketball training apparatus 10 comprises controller 29, which comprises a programmable logic circuit, and Inertial Measurement Unit ("IMU") chip/ triple axis gyroscope operably connected together. In one embodiment, controller 29 comprises a communication unit such as a Wi-Fi or Bluetooth device configured to transmit data generated by controller 29 to a remote device such as a smartphone, tablet or other computing device.

In certain embodiments, controller 29 is electrically coupled to vibration device 26, audio indicator 30, light indicator 32 and Hall Effect transducer 39. Controller 29 is operably connected to sensory array magnets 38, which are disposed within pivot housing 34 of pivot 22. Battery 27 is electrically coupled to controller 29 to provide power to controller 29 and any other components electrically coupled thereto. It shall be appreciated that battery 27 may be of any type including, but not limited to, an alkaline battery, rechargeable battery, or other type battery.

In one embodiment, USB connector 74 is electrically coupled to battery 27 via one or more wires. USB connector 74 is configured to operably connect to a USB power charger that connects to a power outlet or a corresponding USB port of a computing device such as a computer, laptop or other device. These connections allow the power outlet or computing device to charge battery 27 through USB connector 74.

In an alternative embodiment, USB connector 74 is configured to connect to a computing device such as a computer, laptop, electronic tablet, smartphone or other device, for the purpose of transmitting data generated by basketball training apparatus 10 to the computing device. The transmitted data can be later retrieved, reviewed and/or analyzed by the computing device as needed.

FIG. 4 depicts block diagram 36 illustrating the interaction of certain components of basketball training apparatus 10. In a preferred embodiment, circuit board 28, controller 29, vibration device 26 and battery 27 are disposed within upper strut 24 and electrically coupled together via wires as depicted in FIG. 3. Circuit board 28 electrically couples the electrical components of basketball training apparatus 10 together. In one embodiment, audio indicator 30 and light indicator 32 are coupled to the exterior of upper strut 24 and electrically coupled to controller 29. Vibration device 26, audio indicator 30 and light indicator 32 are configured to generate corresponding motion, audio and visual notifications to the user. It shall be appreciated that the location of these components within the strut assembly may vary in certain embodiments.

In one embodiment as depicted in FIG. 4, On/Off switch 70, control button 72 and microchip 76 are electrically coupled to controller 29. These components are coupled to and/or housed within upper strut 24. It shall be appreciated that On/Off switch 70, control button 72 and microchip 76 can be located in variable locations on or in upper strut 24, or in alternative locations on basketball training apparatus 10.

On/Off switch 70 is configured to enable or disable basketball training apparatus 10. Control button 72 is configured for use during the operation of basketball training apparatus 10, which will be described in several embodiments of the invention. Microchip 76 is preferably a PIC microchip in one embodiment of the invention. Microchip 76 is programmable to implement the functionality of basketball training apparatus 10 and is configured to work in conjunction with controller 29. In one embodiment, microchip 76 is programmable to accommodate different options and/or components including, but not limited to, vibration device 26, audio indicator 30, light indicator 32, Wi-Fi/Bluetooth components or other components.

Figure 6:
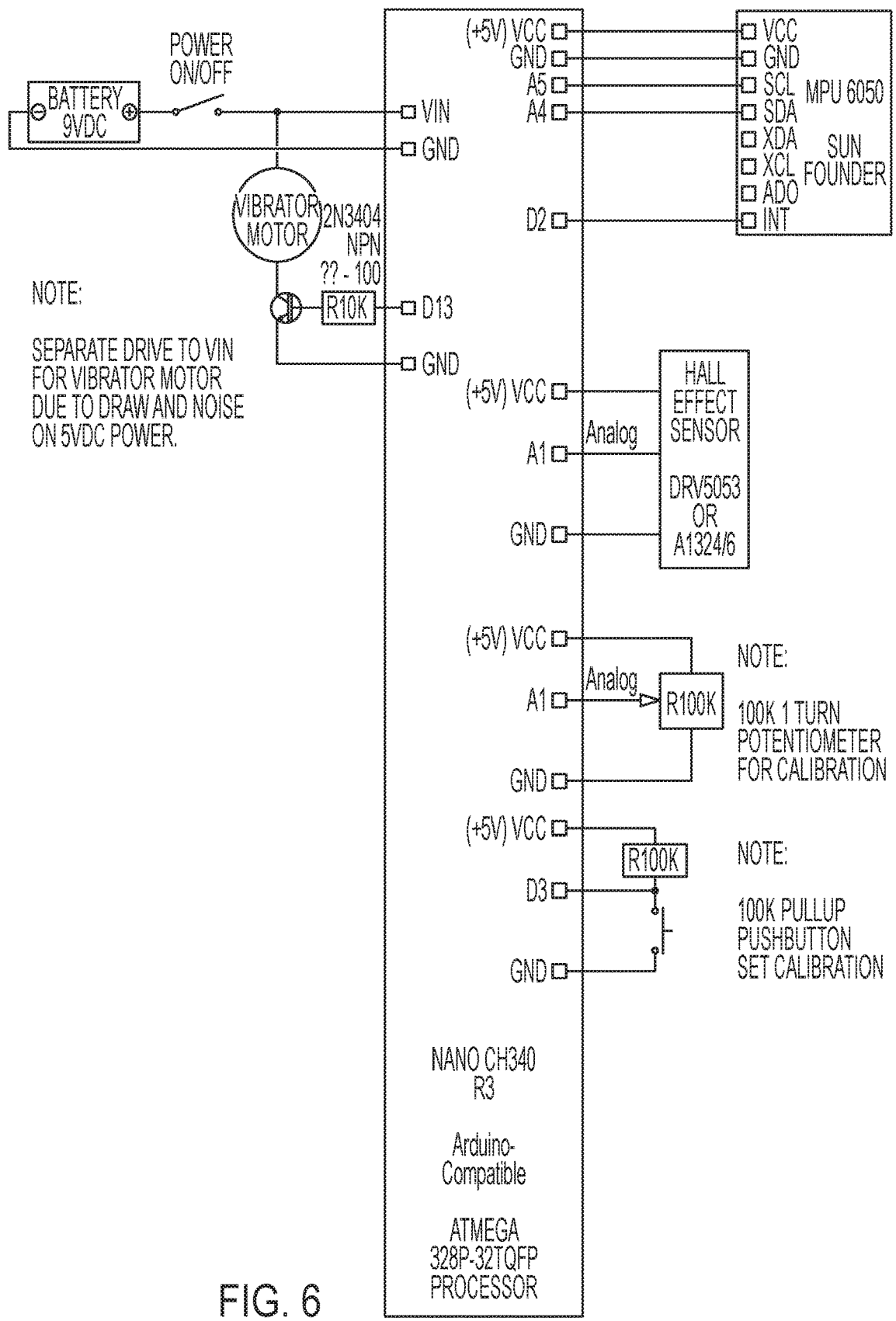
FIG. 6 depicts a schematic view of several electrical components used in certain embodiments of the basketball training apparatus.

In an alternative embodiment, it shall be appreciated that basketball training apparatus 10 can be modified to use any number of controllers, microchips and the like to implement the functionality of basketball training apparatus 10. Components can be added, removed and/or interchanged as needed in basketball training apparatus 10 to achieve the desired function or result. FIG. 6 depicts an exemplary schematic diagram illustrating the connections for components in basketball training apparatus 10 in certain embodiments of the invention.

In certain embodiments as depicted in FIG. 3, pivot housing 34 at the junction of upper and lower struts 24, 20 comprises interior slots configured to receive a pair of sensory array magnets 38. Sensory array magnets 38 comprise a North Pole magnet and a South Pole magnet. Hall Effect transducer 39 is coupled to the central interior portion of pivot housing 34 at pivot 22 and is electrically coupled to controller 29. Pivotal movement of upper strut 24 relative to lower strut 20 permits the pair of sensory array magnets 38 to rotate around Hall Effect transducer 39.

In operation, basketball training apparatus 10 is secured to upper arm 12 and forearm 14 of the user as depicted in FIGS. 1-2. Controller 29 is enabled via On/Off switch 70 to activate basketball training apparatus 10 to an operational mode. Basketball training apparatus 10 provides real-time feedback to the user during the course of the basketball shot from the beginning to the follow-through.

The proper shooting form requires the user to place the upper arm and forearm at approximately 90 degrees relative to each other at the beginning of the shot. In this position, upper arm 12 extends generally parallel to the ground and forearm 14 extends upward with the elbow directed towards the ground. Upper arm 12 and forearm 14 extend upright until they are positioned generally 180 degrees relative to each other on the follow-through, at which point the wrist snaps to allow the user to release the ball to conclude the shot. As shall be apparent, ensuring the user's extension of the upper arm and forearm from 90 degrees to 180 degrees during the basketball shot is important to enhance shooting accuracy and consistency.

In certain embodiments, basketball training apparatus 10 is configured to provide real-time notifications to the user when upper arm 12 and forearm 14 are positioned at approximately 90 degrees and 180 degrees relative to each other. In the secured position, upper strut 24 is aligned with upper arm 12 and lower strut 20 is aligned with forearm 14. As such, angle 40 formed by first longitudinal axis 24a of upper strut 24 and second longitudinal axis 20a of lower strut 20 is generally equal to the angle formed by upper arm 12 and forearm 14 of the user.

Figure 5A:
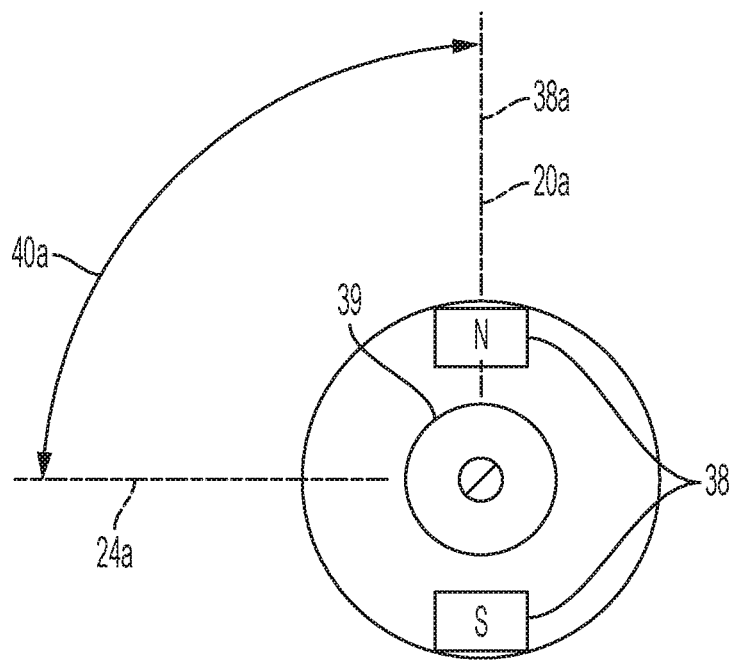
FIG. 5A depicts a schematic view of certain embodiments of the basketball training apparatus with the user's arm in a first optimal angle.

Pivotal movement of upper strut 24 relative to lower strut 20 permits the pair of sensory array magnets 38 to rotate around Hall Effect transducer 39. FIG. 5A depicts the proper shooting form at the beginning of the shot with upper and lower struts 24, 20 positioned in first operational arm position 38a. In this position, sensory array magnets 38 rotate to a first position relative to Hall Effect transducer 39 to orient first longitudinal axis 24a of upper strut 24 and second longitudinal axis 20a of lower strut 20 at first optimal angle 40a, wherein first optimal angle 40a is equal to approximately 90 degrees.

At this time, Hall Effect transducer 39 recognizes first optimal angle 40a is equal to approximately 90 degrees based on the position of sensory array magnets 38 and sends a signal to controller 29. The Inertial Measurement Unit of controller 29 then confirms basketball training apparatus 10 is in the proper orientation with upper arm 12 extending generally parallel to the ground and forearm 14 extending upward against gravity with the elbow directed towards the ground. If confirmed, controller 29 sends a signal to vibration device 26, audio indicator 30 and/or light indicator 32 to generate an alert to the user that upper arm 12 and forearm 14 are in the proper position for the beginning of the shot.

Figure 5B:
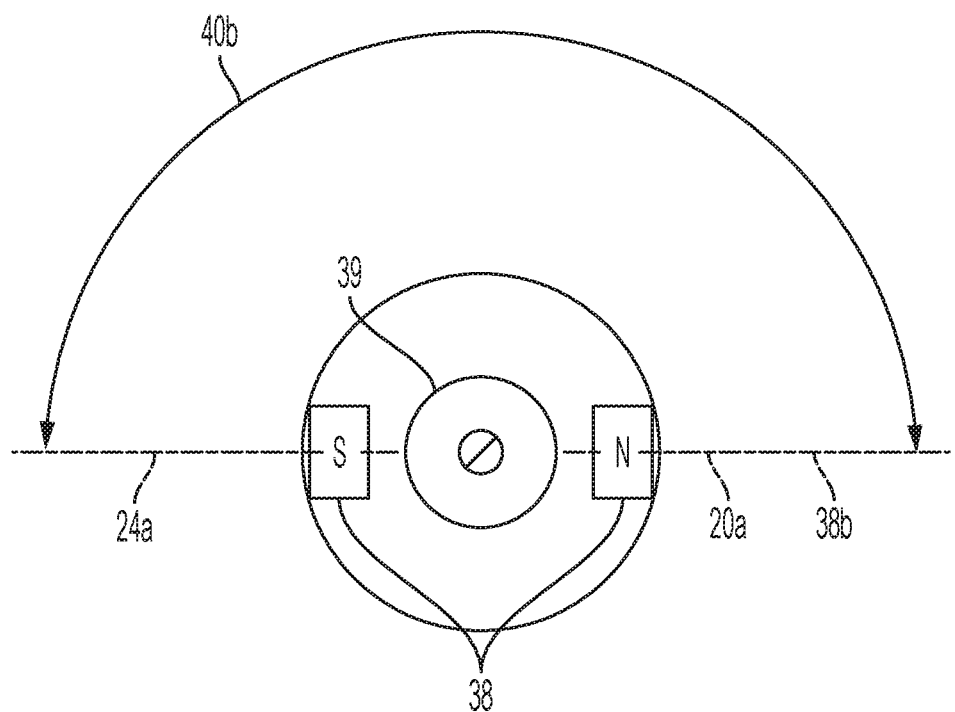
FIG. 5B depicts a schematic view of certain embodiments of the basketball training apparatus with the user's arm in a second optimal angle.

FIG. 5B depicts the proper shooting form at the follow-through of the shot with upper and lower struts 24, 20 positioned in second operational arm position 38b. In this position, sensory array magnets 38 rotate to a second position relative to Hall Effect transducer 39 to orient first longitudinal axis 24a of upper strut 24 and second longitudinal axis 20a of lower strut 20 at second optimal angle 40b, wherein second optimal angle 40b is equal to approximately 180 degrees.

At this time, Hall Effect transducer 39 recognizes second optimal angle 40b is equal to approximately 180 degrees based on the position of sensory array magnets 38 and sends a signal to controller 29. The Inertial Measurement Unit of controller 29 then confirms basketball training apparatus 10 is in the proper orientation with upper arm 12 and forearm 14 extending upward against gravity. If confirmed, controller 29 sends a signal to vibration device 26, audio indicator 30 and/or light indicator 32 to generate an alert to the user that upper arm 12 and forearm 14 are in the proper position at the follow-through of the basketball shot.

It shall be appreciated that the Inertial Measurement Unit of controller 29 is advantageous because it prevents basketball training apparatus 10 from generating an alert when upper arm 12 and forearm 14 of the user are not oriented in the proper upright shooting position, even though the strut assembly is in the first or second optimal angle 40a, 40b. As such, the Inertial Measurement Unit establishes the user's shooting elbow and arm are in the correct starting position as a prerequisite to generating notifications when arm 12 and forearm 14 are oriented at 90 degrees and 180 degrees relative to each other.

It shall be appreciated that several users of basketball training apparatus 10 may not be able to maneuver their upper arms 12 and forearms 14 to the ideal 90 degree and 180 degree positions during a basketball shot. This may be due to the user's age, flexibility and/or athletic ability. In these circumstances, it is desirable to be able to set first or second optimal angles 40a, 40b to alternative angles.

In one embodiment, basketball training apparatus 10 is secured to upper arm 12 and forearm 14 as previously described. Once the apparatus is enabled, the user maneuvers his/her upper arm 12 and forearm 14 to the desired position to set first optimal angle 40a, which is preferably close to approximately 90 degrees. At the desired position, control button 72 is depressed to set the new first optimal angle 40a. The user stretches upper arm 12 and forearm 14 to the desired position to set second optimal angle 40b, which is preferably close to approximately 180 degrees. At the desired position, control button 72 is depressed to set the new second optimal angle 40b.

In this embodiment, controller 29 is configured to send signals to vibration device 26, audio indicator 30 and/or light indicator 32 to generate alerts to the user when upper arm 12 and forearm 14 are in the proper positions based on the newly programmed first and second optimal angles 40a, 40b. This adjustability in setting basketball training apparatus 10 to variable first and second optimal angles 40a, 40b allows the apparatus to easily accommodate the left arm, right arm, and users of different ages, levels of flexibility and athletic ability.

In an alternative embodiment as depicted in FIG. 4, basketball training apparatus 10 comprises mode button 71 electrically coupled to controller 29 and/or microchip 76. Mode button 71 is used to select one of several operating modes including at least a Training Mode and a Freestyle Mode. In one embodiment, selection of the Training Mode requires the user to hold upper arm 12 and forearm 14 at each angle of first and second optimal angles 40a, 40b for approximately 2-3 seconds before the audio, visual and/or vibratory alert terminates. In one embodiment, the selection of the Freestyle Mode reduces the time period of an audio, visual and/or vibratory alert when upper arm 12 and forearm 14 are at the first and second optimal angles 40a, 40b. It shall be appreciated that the length of an alert generated by basketball training apparatus 10 can be programmed to alternative time intervals as desired.

Figure 7:
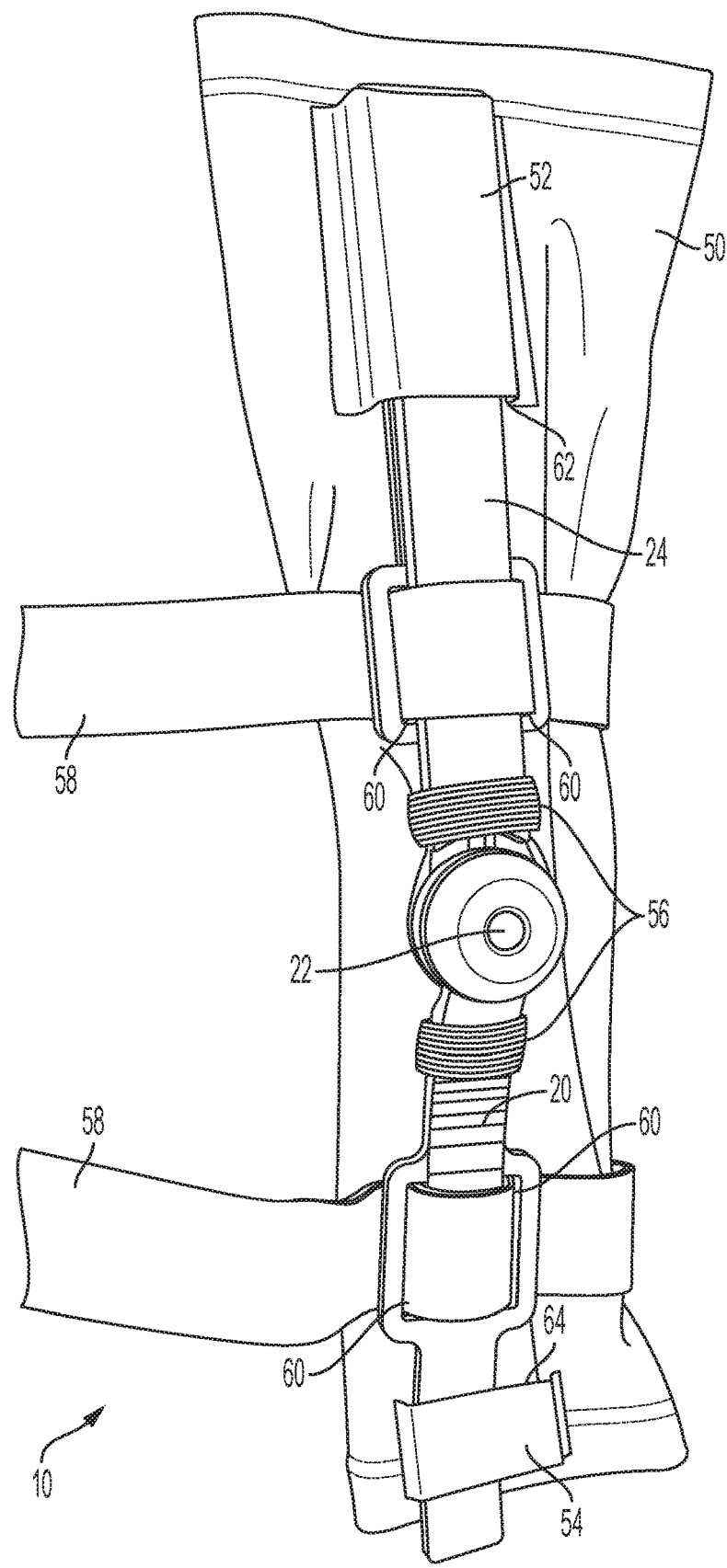
FIG. 7 depicts a side view of an alternative embodiment of the basketball training apparatus.
Figure 8:
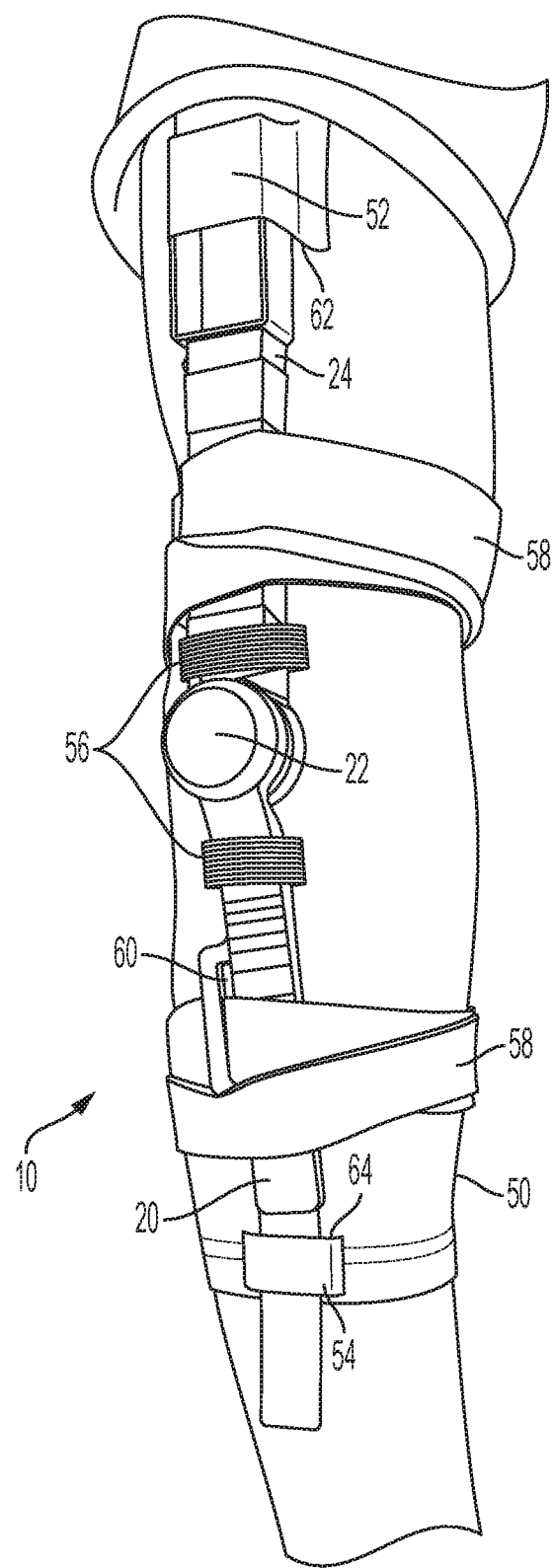
FIG. 8 depicts a side view of the alternative embodiment of the basketball training apparatus.

In an alternative embodiment as depicted in FIGS. 7-8, basketball training apparatus 10 can be secured to upper arm 12 and forearm 14 using alternative fastening components. In one embodiment, upper and lower struts 24, 20 of basketball training apparatus 10 are coupled to sleeve 50, which is disposed around upper arm 12 and forearm 14 of the user.

In certain embodiments, sleeve 50 generally comprises first sheet 52, second sheet 54 and a pair of loops 56 coupled to the outer surface of the sleeve. First sheet 52, second sheet 54 and loops 56 are coupled to sleeve 50 using stitching or other fastening components. Sleeve 50, first sheet 52 and second sheet 54 are made from any deformable and resilient material known in the field.

To secure basketball training apparatus 10 to sleeve 50, upper strut 24 extends through loop 56 and comprises an end portion that extends within first pocket 62, which is formed by space between first sheet 52 and sleeve 50. Similarly, lower strut 20 extends through the other loop 56 and comprises an end portion that extends within second pocket 64, which is formed by space between second sheet 54 and sleeve 50. In one embodiment, second sheet 54 is secured to sleeve 50 so that the top and bottom ends of second pocket 64 remain open to permit lower strut 20 to extend therethrough. In these positions, upper strut 24 is coupled to and aligned with upper arm 12 of the user. Lower strut 20 is coupled to and aligned with forearm 14 of the user.

In one embodiment as depicted in FIGS. 7-8, a pair of straps 58 secure upper and lower struts 24, 20 to sleeve 50. In this embodiment, the pair of straps 58 is coupled to sleeve 50 by stitching or alternative fastening components. A first strap 58 extends through one or more slots 60 in upper strut 24, wraps around sleeve 50 and is secured to itself using hook and loop fasteners, snap components or other fasteners. This allows the first strap 58 to conform around sleeve 50 and upper arm 12 of the user. A second strap 58 extends through one or more slots 60 in lower strut 20, wraps around sleeve 50 and is secured to itself using hook and loop fasteners, snap components or other fasteners. This allows the second strap 58 to conform around sleeve 50 and forearm 14 of the user.

It shall be appreciated that the components of basketball training apparatus 10 described in several embodiments herein may comprise any alternative known materials in the field and be of any color, size and/or dimensions. It shall be appreciated that the components of basketball training apparatus 10 described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A basketball training apparatus for use to provide a user real-time feedback on shooting form, the basketball training apparatus configured to secure to an upper arm and a forearm of the user, the basketball training apparatus comprising:

a sleeve configured to dispose around the upper arm and forearm of the user;

a pair of loops coupled to the sleeve;

a strut assembly coupled to the sleeve and comprising an upper strut pivotably mounted to a lower strut, the upper strut extending through a first loop in the pair of loops and configured to couple to the upper arm of the user, the lower strut extending through a second loop in the pair of loops and configured to couple to the forearm of the user, the strut assembly comprising a pivot housing at a junction of the upper and lower struts;

a Hall Effect sensor disposed within the junction of the strut assembly;

a pair of magnets coupled to an interior of the pivot housing of the strut assembly;

a controller disposed within the upper strut of the strut assembly and electrically coupled to the Hall Effect sensor; and an alert mechanism disposed within the upper strut of the strut assembly and electrically coupled to the controller;

wherein pivotal movement of the upper strut relative to the lower strut to a first optimal angle defined by a first longitudinal axis of the upper strut and a second longitudinal axis of the lower strut positions the pair of magnets in a first operational position relative to the Hall Effect sensor to enable the alert mechanism to generate a first notification, wherein pivotal movement of the upper strut relative to the lower strut to a second optimal angle formed by the first longitudinal axis of the upper strut and the second longitudinal axis of the lower strut positions the pair of magnets in a second operational position relative to the Hall Effect sensor to enable the alert mechanism to generate a second notification.

2. The basketball training apparatus of claim 1, further comprising a first sheet coupled to the sleeve and forming a first pocket between the first sheet and sleeve, and a second sheet coupled to the sleeve and forming a second pocket between the second sheet and sleeve, wherein an end portion of the upper strut is disposed within the first pocket and an end portion of the lower strut is disposed within the second pocket.

3. The basketball training apparatus of claim 2, wherein the controller comprises an Inertial Measurement Unit electrically coupled to the Hall Effect sensor, the alert mechanism configured to generate the first notification upon a determination by the Inertial Measurement Unit that the upper strut extends to the lower strut in a generally upright position against gravity, the alert mechanism configured to generate the second notification upon a determination by the Inertial Measurement Unit that the upper strut extends to the lower strut in a generally upright position against gravity.

4. The basketball training apparatus of claim 3, wherein the first optimal angle is equal to approximately 90 degrees and the second optimal angle is equal to approximately 180 degrees.

5. The basketball training apparatus of claim 4, wherein the controller comprises a communication unit configured to transmit data generated by the controller to a remote device.

6. The basketball training apparatus of claim 5, wherein the communication unit comprises a Wi-Fi or Bluetooth device.

7. The basketball training apparatus of claim 6, further comprising a first strap coupled to the upper strut and configured to conform around the sleeve and upper arm of the user and a second strap coupled to the lower strut and configured to conform around the sleeve and forearm of the user.

8. The basketball training apparatus of claim 7, further comprising a mounting pad coupled to the lower strut and configured to contact the forearm of the user.

9. The basketball training apparatus of claim 8, wherein the alert mechanism comprises a vibration generating device, wherein the first and second notifications comprise motion notifications.

10. The basketball training apparatus of claim 8, wherein the alert mechanism comprises an audio generating device, wherein the first and second notifications comprise audible notifications.

11. The basketball training apparatus of claim 8, wherein the alert mechanism comprises a light generating device, wherein the first and second notifications comprise visual notifications.

12. The basketball training apparatus of claim 8, further comprising a microchip electrically coupled to the controller.

13. The basketball training apparatus of claim 12, further comprising a battery electrically coupled to the controller.

14. The basketball training apparatus of claim 13, further comprising a USB connector electrically coupled to the battery.

* * * * *